US012594909B2

(12) United States Patent
Yang

(10) Patent No.: US 12,594,909 B2
(45) Date of Patent: Apr. 7, 2026

(54) SPRAY STRUCTURE FOR CLEANING A SENSOR

(71) Applicants: HYUNDAI MOTOR COMPANY, Seoul (KR); KIA CORPORATION, Seoul (KR)

(72) Inventor: Young Dug Yang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 477 days.

(21) Appl. No.: 17/987,597

(22) Filed: Nov. 15, 2022

(65) Prior Publication Data

US 2023/0182689 A1 Jun. 15, 2023

(30) Foreign Application Priority Data

Dec. 15, 2021 (KR) ........................ 10-2021-0179601

(51) Int. Cl.
| | |
|---|---|
| *B60S 1/52* | (2006.01) |
| *B60S 1/48* | (2006.01) |
| *B60S 1/54* | (2006.01) |
| *B60S 1/56* | (2006.01) |

(52) U.S. Cl.
CPC ................. *B60S 1/52* (2013.01); *B60S 1/481* (2013.01); *B60S 1/54* (2013.01); *B60S 1/56* (2013.01)

(58) Field of Classification Search
CPC ...... B60S 1/52; B60S 1/54; B60S 1/56; B60S 1/481; B05B 7/0982; B05B 7/0823; B05B 7/0838; B05B 1/1636; B05B 1/609

USPC .............................. 239/284.1, 284.2, 581.2
See application file for complete search history.

(56) References Cited

U.S. PATENT DOCUMENTS

| | | | | |
|---|---|---|---|---|
| 3,127,116 A | * | 3/1964 | Pollock | B60T 17/226 |
| | | | | 239/284.2 |
| 8,276,833 B2 | * | 10/2012 | Cheng | E03C 1/0409 |
| | | | | 239/443 |
| 10,065,610 B2 | * | 9/2018 | Wakatsuki | B60S 1/62 |
| 11,273,798 B2 | | 3/2022 | Giraud | |
| 2016/0325715 A1 | * | 11/2016 | Niemczyk | B60S 1/528 |
| 2018/0201231 A1 | * | 7/2018 | Tani | G02B 27/0006 |
| 2019/0106086 A1 | | 4/2019 | Giraud | |
| 2021/0048532 A1 | * | 2/2021 | Chung | G01S 7/4817 |
| 2021/0061237 A1 | * | 3/2021 | Krishnan | G01S 7/4813 |

FOREIGN PATENT DOCUMENTS

| | | | | | |
|---|---|---|---|---|---|
| CN | 109952162 A | * | 6/2019 | ........... | B05B 7/2464 |
| KR | 20180136981 A | | 12/2018 | | |

OTHER PUBLICATIONS

CN109952162 Translation (Year: 2019).*

* cited by examiner

*Primary Examiner* — Steven M Cernoch
(74) *Attorney, Agent, or Firm* — Lempia Summerfield Katz LLC

(57) ABSTRACT

A spray structure for cleaning a sensor includes a first plate rotatably mounted on an environmental sensor, a plurality of first nozzles formed on the first plate and disposed toward the environmental sensor, and a fluid supply source configured to supply a fluid to the plurality of first nozzles so that the fluid is sprayed therethrough.

18 Claims, 9 Drawing Sheets

SPRAY STRUCTURE FOR CLEANING A SENSOR

CROSS-REFERENCE TO RELATED APPLICATION

This application claims under 35 U.S.C. § 119(a) the benefit of priority to Korean Patent Application No. 10-2021-0179601, filed on Dec. 15, 2021, the entire contents of which are incorporated herein by reference.

BACKGROUND

(a) Technical Field

The present disclosure relates to a spray structure for cleaning a sensor and, more particularly, to a spray structure for cleaning an environmental sensor.

(b) Background

Recently, a driver assistance system that assists a vehicle driver is mounted on a vehicle in order to secure safe driving in various driving situations. Moreover, in addition to the driver assistance system, research and development on autonomous vehicles that can self-drive without driver intervention is being actively conducted.

For such a driver assistance system or autonomous vehicles, various types of environmental sensors capable of sensing the surrounding environment in various ways are required. An environmental sensor mounted on a vehicle may include a radar, a lidar, a camera, and the like.

Since these sensors are mounted on the outside of a vehicle, a sensing area may be easily dirtied by foreign substances, such as dust, rain, snow, or the like. In order to maintain sensor performance, these sensors need to be kept clean beyond a certain level. Accordingly, a vehicle may be equipped with a contamination detection device for detecting contamination of these sensors and a sensor cleaning system capable of cleaning the contaminated sensing areas of the sensors based on the detected contamination.

The above information disclosed in this Background section is only for enhancement of understanding of the background of the disclosure and accordingly it may include information that does not form the prior art that is already known to a person of ordinary skill in the art.

SUMMARY OF THE DISCLOSURE

The present disclosure has been made in an effort to solve the above-described problem associated with the related art, and an objective of the present disclosure is to provide a spray structure for more effectively cleaning an environmental sensor.

The objective of the present disclosure is not limited to the aforementioned objective, and the other objectives not mentioned may be clearly understood by those with ordinary skill in the art to which the present disclosure pertains from the following description.

The features of the present disclosure for achieving the object of the present disclosure and performing the characteristic functions of the present disclosure to be described are as follows below.

According to an aspect of the present disclosure, a spray structure for cleaning a sensor is provided. The spray structure includes: a first plate rotatably mounted on an environmental sensor; a plurality of first nozzles formed on the first plate and disposed toward the environmental sensor; and a fluid supply source configured to supply a fluid to the plurality of first nozzles so that the fluid is sprayed therethrough.

According to another aspect of the present disclosure, a method of controlling the spray structure for cleaning a sensor is provided. The spray structure includes: a plate rotatably mounted on an environmental sensor and including a plurality of nozzles configured to spray a fluid from a fluid supply source toward the environmental sensor; a driving source providing a rotational force to the plate; and a controller configured to control an operation of the fluid supply source. The method includes, by the controller: actuating the fluid supply source; and selectively driving the driving source while the fluid supply source is being driven.

According to the spray structure of the present disclosure, the environmental sensor, such as a lidar, can be more effectively cleaned.

The effects of the present disclosure are not limited to those described above, and other effects not mentioned should be clearly recognized by those having ordinary skill in the art from the following description.

BRIEF DESCRIPTION OF THE DRAWINGS

The above and other features of the present disclosure are now described in detail with reference to certain examples thereof illustrated in the accompanying drawings, which are given herein below by way of illustration only and thus are not limitative of the present disclosure, and wherein.

DETAILED DESCRIPTION

Figure 1:
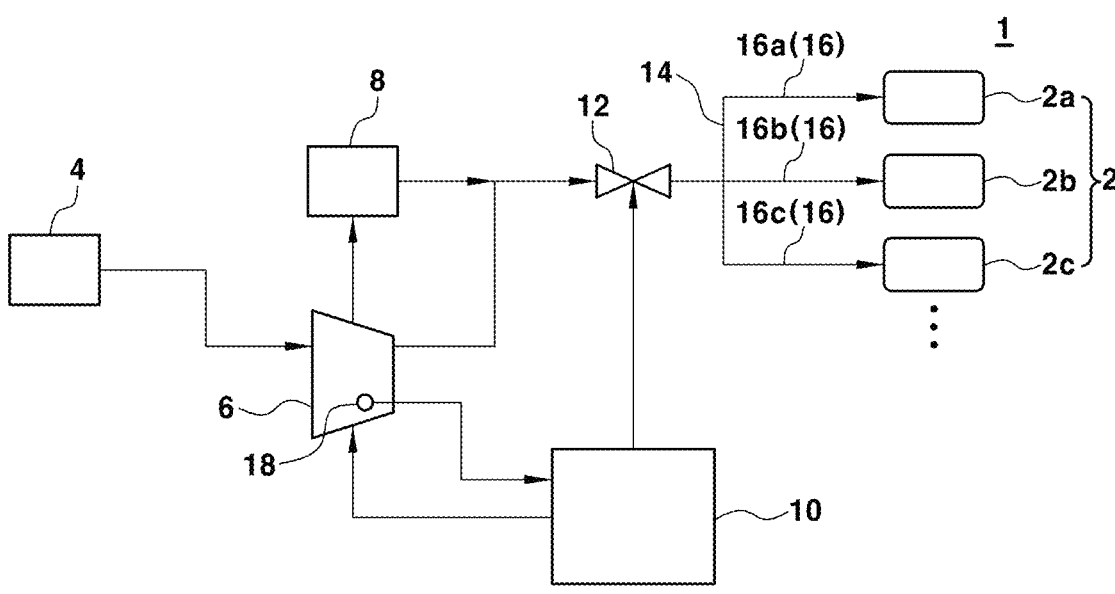
FIG. 1 illustrates an air cleaning system.

Specific structural or functional descriptions presented in embodiments of the present disclosure are only exemplified for the purpose of describing the embodiments according to the concept of the present disclosure. The embodiments according to the concept of the present disclosure may be carried out in various forms. Further, the embodiments should not be interpreted as being limited to the embodiments described in the present specification and should be understood as including all modifications, equivalents, and substitutes included in the spirit and scope of the present disclosure.

In the present disclosure, terms such as first and/or second may be used to describe various components, but the components are not limited to the terms. The terms are used only for the purpose of distinguishing one component from other components. For example, a first component may be referred to as a second component. Likewise, the second component may also be referred to as the first component, without departing from the scope according to the concept of the present disclosure.

When a component is referred to as being "connected" or "coupled" to another component, it should be understood that the components may be directly connected or coupled to each other, but still other component may also exist therebetween. On the other hand, when a component is referred to as being "directly connected to" or "in direct contact with" another component, it should be understood that there is no other component therebetween. Other expressions for describing the relationship between components, i.e., expressions such as "between" and "directly between" or "adjacent to" and "directly adjacent to," should be also interpreted in the same manner.

Throughout the specification, the same reference numerals refer to the same or equivalent elements. The terms used in the present specification are for the purpose of describing the embodiments and are not intended to limit the present disclosure. In the present specification, the singular form also includes the plural form unless otherwise specified in the phrase. "Comprises" and/or "comprising" used in the specification specifies the presence of the mentioned component, step, operation, and/or element and does not exclude the presence or the addition of one or more other components, steps, operations, and/or elements.

Hereinafter, the present disclosure is described in detail with reference to the accompanying drawings. When a component, device, element, or the like of the present disclosure is described as having a purpose or performing an operation, function, or the like, the component, device, or element should be considered herein as being "configured to" meet that purpose or to perform that operation or function.

As described above, various types of environmental sensors for sensing the surrounding environment are installed in autonomous vehicles, vehicles equipped with a driver assistance system, and the like. As a non-limiting example, the environmental sensor may include a lidar, a radar, a camera, and the like, and the environmental sensor may be disposed on a front part, a rear part, a side part, a roof, and the like, of a vehicle.

Since most of vehicles are outdoors and in driving conditions, environmental sensors mounted on the outside of a vehicle may be stained not only by rain, but also by foreign substances, such as dust and insects. A sensor cleaning system is thus provided in a vehicle to clean the stained environmental sensors. The cleaning of the environmental sensors may be performed with a washer fluid or by spraying high-pressure compressed air.

A sensor cleaning system provided in a vehicle is illustrated in FIG. 1. Among the sensor cleaning systems, an air cleaning system 1 is configured to clean the environmental sensor 2 by using compressed air. The air cleaning system 1 performs cleaning by spraying the compressed air onto the surface of the environmental sensor 2.

Specifically, air filtered through an air filter 4 provided in a vehicle is introduced into a compressor 6. As the air compressed by the compressor 6 is sprayed onto the surface of the environmental sensor 2, foreign substances are removed from the environmental sensor 2. The environmental sensor 2 may include a plurality of environmental sensors 2a, 2b, and 2c, which may be mounted on a front part, a rear part, a roof, a side part, and the like, of a vehicle. Although three environmental sensors are illustrated and disclosed in the drawings and specification, the number of the environmental sensors is not limited thereto, but may increase or decrease.

The air cleaning system 1 also includes an air tank 8. The compressed air produced by the compressor 6 or air from an external device may be filled in the air tank 8, and the air filled in the air tank 8 may be used to clean the environmental sensor 2.

The air cleaning system 1 includes a controller 10 that is configured to actuate a valve 12, for example, a solenoid valve, at preset intervals or in a preset situation, such as, upon contamination detection of the environmental sensor 2, or the like. This allows the compressed air to be sprayed from the compressor 6 or the air tank 8 toward respective environmental sensors 2 so that the compressed air cleans the environmental sensors 2. The valve 12 may be provided with a distributor 14 with which the compressed air can be distributed through nozzles 16, including nozzle 16a, 16b, and 16c, respectively provided for respective environmental sensors 2 (i.e., 2a, 2b, and 2c).

The compressor 6 is provided with a temperature sensor unit 18 that senses a temperature of the compressor 6 and transmits the sensed temperature to the controller 10 of the air cleaning system 1. The operation of the compressor 6 may be controlled depending on the temperature sensed by the temperature sensor unit 18.

The controller 10 is configured to control the operation of the air cleaning system 1. For example, the controller 10 is configured to open and close the valve 12 as necessary so that the environmental sensor 2 is cleaned. In addition, the controller 10 may be configured to monitor the temperature sensed by the temperature sensor unit 18 and control the operation of the compressor 6 based on the sensed temperature.

Among the sensor cleaning systems, similar to the air cleaning system 1, a washer fluid cleaning system may also be configured to supply a washer fluid stored in a vehicle to the environmental sensors disposed on respective positions of the vehicle.

Figure 2:
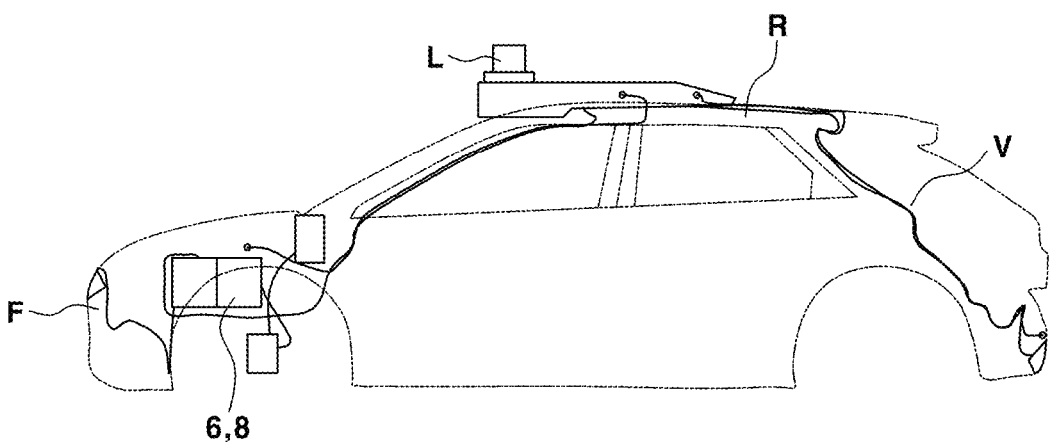
FIG. 2 illustrates a lidar mounted on a vehicle.

As illustrated in FIG. 2, an environmental sensor, in particular, a lidar sensor L, is installed on the roof R of a vehicle V. Like other environmental sensors, the lidar sensor L may be configured to be supplied with the compressed air from the compressor 6 or the air tank 8, which is usually disposed on the front side F of a vehicle V. If necessary, the compressed air may be sprayed toward the lidar sensor L to perform cleaning. However, the lidar sensor L is more likely to be exposed to contaminants than other environmental sensors due to its 360° open arrangement.

Accordingly, the present disclosure aims at providing a sensor cleaning system capable of effectively cleaning an environmental sensor, particularly, the lidar sensor L. In particular, the present disclosure is intended to provide a spray structure for more effectively cleaning an environmental sensor, such as the lidar sensor L, having a large operating area. However, the spray structure according to the present disclosure may be applicable to other environmental sensors, in addition to the lidar sensor. In particular, the spray structure according to the present disclosure is advantageously applied to an environmental sensor with a large sensing area.

Figure 3:
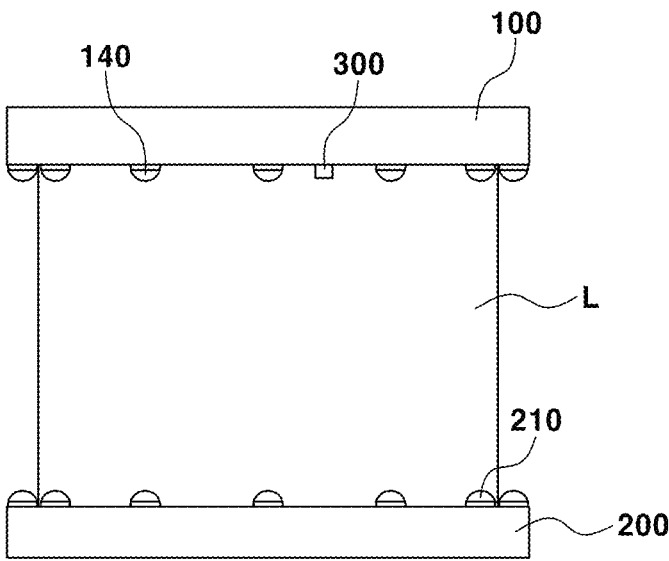
FIG. 3 illustrates a lidar sensor and a spray structure for use in the lidar sensor according to an embodiment of the present disclosure.

As illustrated in FIG. 3, according to an embodiment of the present disclosure, the spray structure includes an upper plate 100 and a lower plate 200. The upper plate 100 and the lower plate 200 may be mounted on upper and lower ends of the lidar sensor L, respectively. In the drawings, although the lidar sensor L, the upper plate 100, and the lower plate 200 are illustrated as being cylindrical, the present disclosure is not limited to this shape, but may take other shapes.

At least one of the upper plate 100 or the lower plate 200 is rotatably mounted to the lidar sensor L. In an implementation, the upper plate 100 is rotatably coupled to the lidar sensor L. In another implementation, the lower plate 200 is rotatably mounted on the lidar sensor L. In a further implementation, both the upper plate 100 and the lower plate 200 are rotatably mounted on the lidar sensor L. If it is configured that either the upper plate 100 or the lower plate 200 needs to be rotatable, it may be more advantageous to make the upper plate 100 rotatable. Hereinafter, a reference is made to the case in which only the upper plate 100 rotates, whereas the lower plate 200 is fixed. However, as described above, each or all of the lower plate 200 and the upper plate 100 may be configured to be rotatable.

Figure 4A:
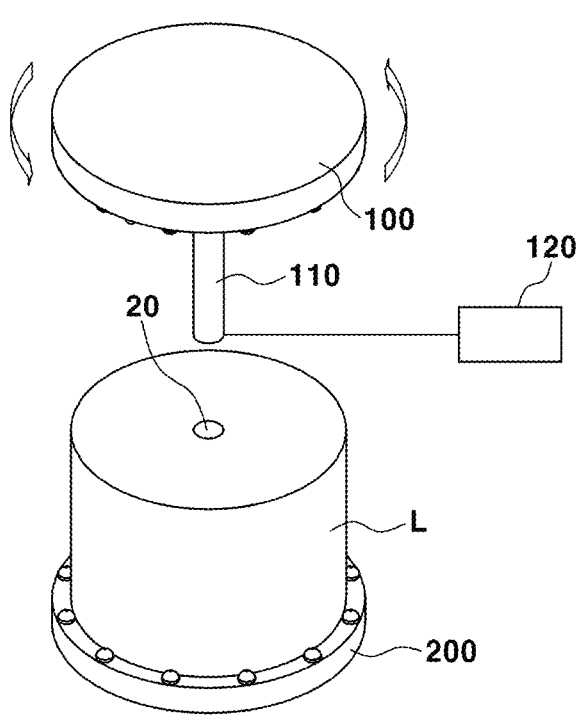
FIG. 4A is an exploded perspective view of FIG. 3.

Referring to FIG. 4A, the spray structure may include a rotary section for rotation of the upper plate 100. To this end, in an implementation, the upper plate 100 may include a rod 110. The rod 110 may be formed in the center of the upper plate 100 and may protrude from the center of the upper plate 100.

The rod 110 is configured to be rotatable. Specifically, the rod 110 may be rotated with a rotational force from a driving source 120. For example, the driving source 120 may be a motor configured to rotate the rod 110. Accordingly, the upper plate 100 connected to the rod 110 may rotate along with the rotation of the rod 110.

In addition, the rod 110 is configured to be insertable or rotatably insertable into the lidar sensor L. In an implementation, the rod 110 may be rotatably accommodated in a hole 20 provided in the center of the lidar sensor L.

Figure 4B:
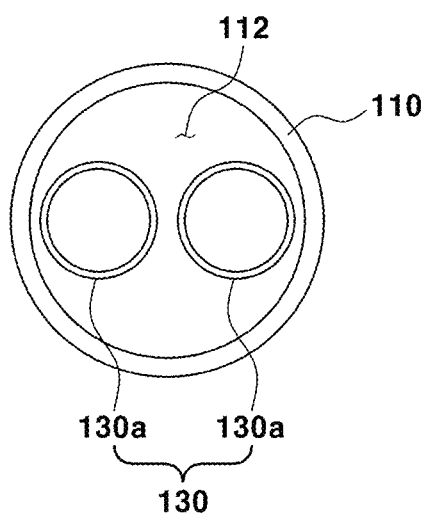
FIG. 4B is a cross-sectional view of a rod illustrated in FIG. 3.

Referring to FIG. 4B, the rod 110 has a hollow portion 112 therein, and a supply channel 130 may be accommodated in the hollow portion 112. The compressed air or the washer fluid may flow through the supply channel 130. For example, the supply channel 130 may be a hose for supplying the compressed air from the compressor 6 to the lidar sensor L. Alternatively, the supply channel 130 may be a hose for supplying the washer fluid from a washer fluid reservoir to the lidar sensor L.

The rod 110 may be provided with at least one supply channel 130 accommodated in the hollow portion 112. In an implementation, the hollow portion 112 may be provided with two supply channels 130a, 130b. The compressed air flows through one of the supply channels 130a, 130b, while the washer fluid flows through the other of the supply channels 130a, 130b. In some implementations, the supply channels 130 may be configured to branch off to the upper plate 100 and the lower plate 200.

Figure 5:
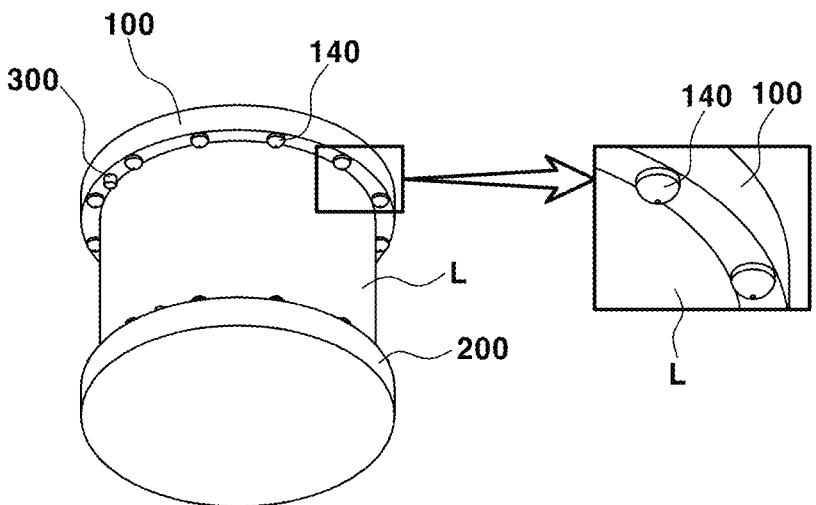
FIG. 5 is a bottom perspective view illustrating a lidar sensor and a spray structure for use in the lidar sensor according to an embodiment of the present disclosure.

As illustrated in FIG. 5, the upper plate 100 includes one or more upper nozzles 140. The one or more upper nozzles 140 may be disposed on the upper plate 100 at regular intervals along the periphery of the upper plate 100. In an implementation, the upper nozzle(s) 140 may be formed on a lower surface of the upper plate 100 to face the lidar sensor L side or downward. The upper nozzle(s) 140 is configured to be in fluid communication with the supply channel 130 so that the compressed air or the washer fluid may be sprayed toward the lidar sensor L through the upper nozzle(s) 140.

Figure 6:
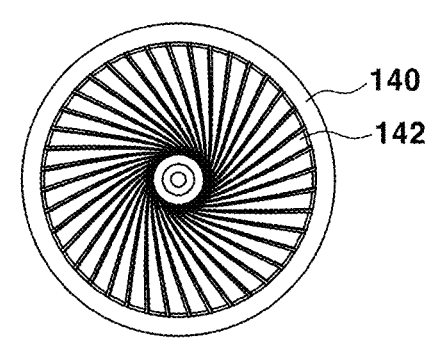
FIG. 6 is a cross-sectional view illustrating an upper nozzle or a lower nozzle according to an embodiment of the present disclosure.

Referring to FIG. 6, in an implementation, grooves 142 may be formed on an inner surface of an upper nozzle 140. The grooves 142 are formed on the inner surface of the upper nozzle 140 and along the longitudinal direction of the upper nozzle 140. In addition, the grooves 142 may have a spiral shape as a whole. In other words, the grooves 142 may extend on the inner surface of the upper nozzle 140 not linearly but obliquely in a spiral direction. As described below, similar to the grooves 142 of the upper nozzle 140, grooves may be formed on an inner surface of the lower nozzle 210.

Figure 7:
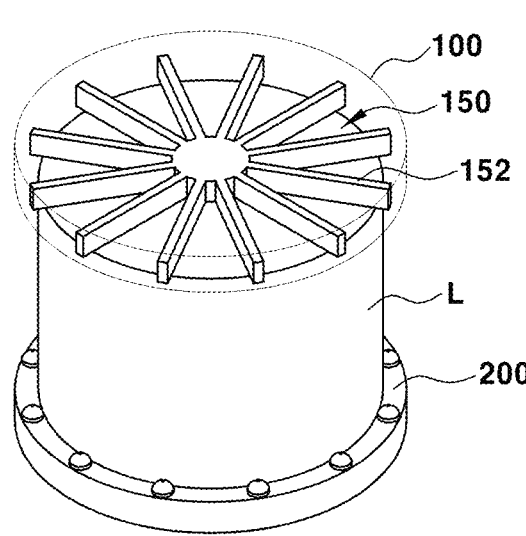
FIG. 7 illustrates a lidar sensor and a spray structure for use in the lidar sensor according to an embodiment of the present disclosure in a transparent view showing the inside of an upper plate.
Figure 8:
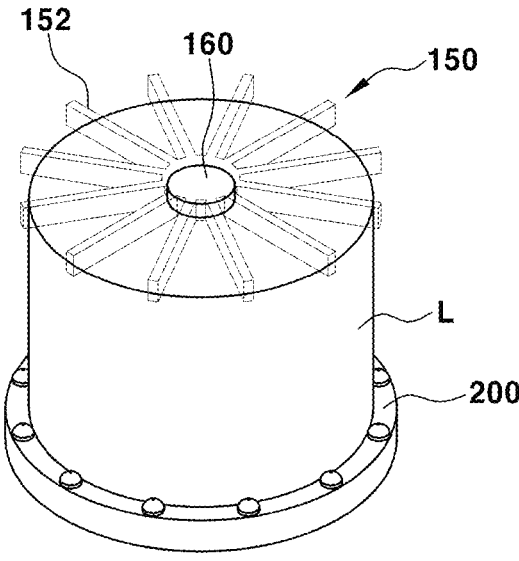
FIG. 8 illustrates a lidar sensor and a spray structure for use in the lidar sensor according to an embodiment of the present disclosure in a state in which the upper plate is omitted.

As illustrated in FIGS. 7 and 8, the upper plate 100 includes a manifold 150. The manifold 150 is disposed inside the upper plate 100. An inlet of the manifold 150 may be the rod 110 or the supply channel 130 in the rod 110. Outlets of the manifold 150 may be configured in fluid communication with each upper nozzle 140 of the upper plate 100. From the inlet to each outlet of the manifold 150, radial flow paths 152 may extend in a radial direction of the upper plate 100. In an implementation, the manifold 150 may be integrally formed with the rod 110. In another implementation, the manifold 150 may be separately provided so that the manifold is coupled to the rod 110. In addition, in an implementation, the manifold 150 may be integrally formed with the upper plate 100. For example, the manifold 150 may be structures directly formed on the inner surface of the upper plate 100. In still another implementation, the manifold 150 may be separate components accommodated in the upper plate 100.

A spray valve 160 may be disposed in the manifold 150. In an implementation, the spray valve 160 may be disposed at the inlet of the manifold 150. The spray valve 160 is configured to be rotatable together with the upper plate 100 such that the spray valve is linearly movable in the upper plate 100. For example, the spray valve may be configured to be movable up and down in a space of the inlet of the manifold 150.

The spray valve 160 is configured to allow the supply channel 130 of the rod 110, the manifold 150, and the upper nozzles 140 to communicate with each other. The spray valve 160 may allow the compressed air or the washer fluid to be sprayed through any one or all of the plurality of radial flow paths 152. To this end, in an implementation, the spray valve 160 includes a single-spray position P1 and a multiple-spray position P2.

Figure 9A:
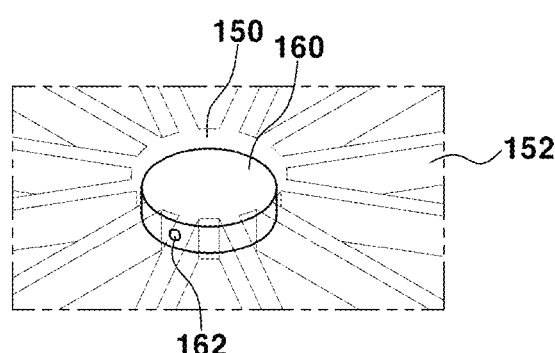
FIG. 9A is a partially enlarged view of FIG. 8.
Figure 9B:
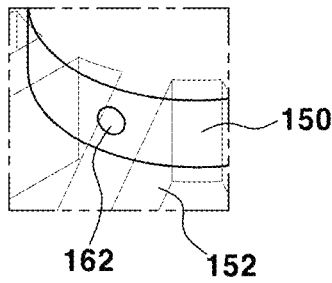
FIG. 9B is a partially enlarged view of FIG. 9A.
Figure 9C:
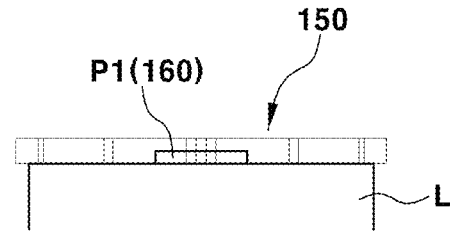
FIG. 9C is a front view of FIG. 7, showing a spray valve in a single spray position.

Referring to FIGS. 9A-9C, the spray valve 160 includes one opening 162. In some implementations, the opening 162 of the spray valve 160 may be positioned to allow the supply channel 130 to communicate with one of the radial flow paths 152 of the manifold 150. In this single-spray position P1, the opening 162 of the spray valve 160 is aligned with any one of the radial flow paths 152 of the manifold 150, allowing the supply channel 130 and the upper nozzle 140 to communicate with each other only through this particular radial flow path 152. Accordingly, it is possible to spray air through a single upper nozzle 140. As well illustrated in FIG. 9C, in the single-spray position P1, the spray valve 160 may be in close contact with an end of the rod 110.

Figure 10:
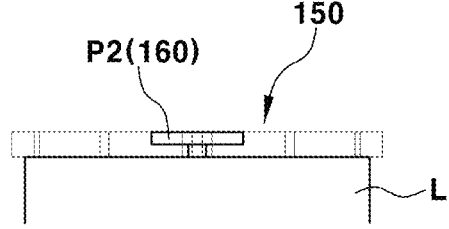
FIG. 10 is a front view of FIG. 7, showing the spray valve in a multiple spray position.

Referring to FIG. 10, in some implementations, the spray valve 160 may be positioned to allow the supply channel 130 to communicate with all of the radial flow paths 152 of the manifold 150. In this multiple-spray position P2, the spray valve 160 moves upward in the upper plate 100 or in the manifold 150 to be spaced apart from the end of the rod 110, allowing for communication between the supply channel 130 and all radial flow paths 152. Accordingly, the compressed air or the washer fluid may flow to all of the radial flow paths 152 and may flow through beneath the spray valve 160 so that the compressed air or washer fluid is sprayed out of all the upper nozzles 140.

Figure 11:
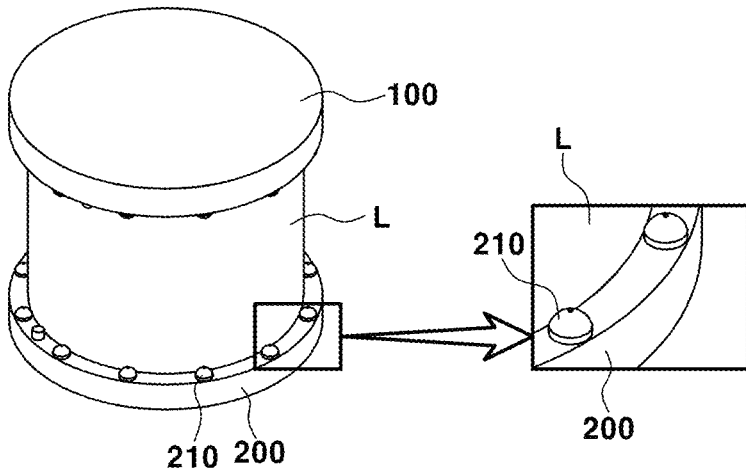
FIG. 11 is a top perspective view illustrating a lidar sensor and a spray structure for use in the lidar sensor according to an embodiment of the present disclosure.

As illustrated in FIG. 11, the lower plate 200 includes a plurality of lower nozzles 210. In an implementation, the lower nozzles 210 may be circumferentially provided on an upper surface of the lower plate 200 at regular intervals. In an implementation, the lower nozzles 210 may be configured to spray the compressed air or the washer fluid upward or toward the lidar sensor L.

The compressed air or the washer fluid may be sprayed through the lower nozzles 210. Similar to the upper plate 100, the compressed air or the washer fluid may be supplied from the supply channel 130 disposed in the rod 110 to the lidar sensor L sequentially through the manifold provided in the lower plate 200 and the lower nozzles 210. In addition, similar to the grooves of the upper nozzle 140, grooves may be formed on the inner surface of the lower nozzle 210.

The configuration of the lower plate 200 should be easily understood by those having ordinary skill in the art in light of the description about the upper plate 100, so a redundant description thereof has been omitted. However, in some implementations, unlike the upper plate 100, the lower plate 200 may not be configured to be rotatable. In addition, in some embodiments, the lower plate 200 may also be configured to be rotatable together with the upper plate 100.

The spray structure according to the present disclosure may include a foreign substance detection sensor 300. As a non-limiting example, the foreign substance detection sensor 300 may be a laser sensor. The foreign substance detection sensor 300 may be mounted on the upper plate 100. A plurality of foreign substance detection sensors 300 may be disposed along the circumference of the upper plate 100 to detect contamination of the surface of the lidar sensor L. However, according to the present disclosure, since the upper plate 100 is configured to be rotatable with respect to the lidar sensor L, even a single foreign substance detection sensor 300 may detect the contamination of the entire surface of the lidar sensor L.

Figure 12:
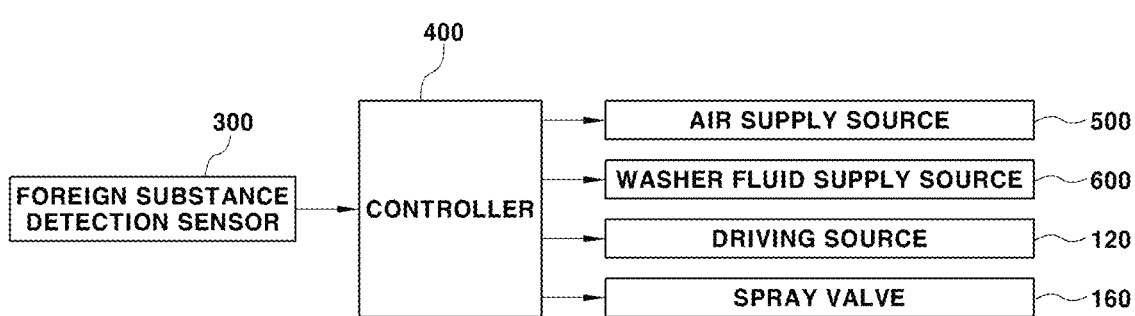
FIG. 12 illustrates a spray operation of the spray structure of the present disclosure.

As illustrated in FIG. 12, a controller 400 is provided to control the operation of various components of the spray structure according to the present disclosure. In an implementation, the controller 400 may be a controller of a vehicle sensor cleaning system, such as the air cleaning system 1, or a controller separately provided for cleaning the lidar sensor L. Hereinafter, a description is made with respect to a separate controller for the spray structure.

The controller 400 is configured to collect sensing information from the foreign substance detection sensor 300. When detecting a foreign substance on the surface of the lidar sensor L, the foreign substance detection sensor 300 may provide information about the presence or absence of a foreign substance and location information of the foreign substance to the controller 400.

The controller 400 is configured to spray the compressed air or the washer fluid to the lidar sensor L as required, such as upon receipt of contamination information of the lidar sensor L. For example, the controller is configured to allow the compressed air or the washer fluid to be sprayed to the lidar sensor L through the supply channel 130 in communication with the air cleaning system 1 or the washer fluid cleaning system of a vehicle V. Specifically, the compressed air may be provided to the supply channel 130 from the compressor 6 or an air supply source 500, such as the air tank 8 in the air cleaning system 1. Alternatively, the washer fluid may be supplied to the supply channel 130 from a washer fluid supply source 600 of the washer fluid cleaning system.

In addition, the controller 400 may be configured to control the operation of the spray structure. If there is a foreign substance in a specific part of the lidar sensor L, the spray valve 160 is placed in a single-spray position P1 in which the compressed air is sprayed toward the specific part through the opening 162. In other words, the compressed air may be sprayed onto the specific part of the lidar sensor L through the single upper nozzle 140. In this case, the controller 400 may be configured to activate the driving source 120 to rotate the upper plate 100. In addition, if the lidar sensor L requires overall cleaning, the controller 400 is configured to command the spray valve 160 to move. Based on the command of the controller 400, the spray valve 160 moves to a multiple-spray position P2 in which a fluid including the compressed air or the washer fluid is sprayed out of all of the upper nozzles 140 through all of the radial flow paths 152 of the manifold 150.

Referring to FIGS. 13-17, the operation of the spray structure according to the present disclosure is described as follows. Hereinafter, the operation of the spray structure is described by taking the compressed air spray as an example.

For cleaning the lidar sensor L, the controller 400 is configured to control the air cleaning system 1 to open the valve 12 so that the compressed air is supplied to the supply channel 130. In addition, the controller 400 may take a single-spray mode in a single-spray position P1, a multiple-spray mode in a multiple-spray position P2, and a dual-spray mode in which the compressed air is sprayed through both the upper nozzles 140 and the lower nozzles 210.

Figure 13:
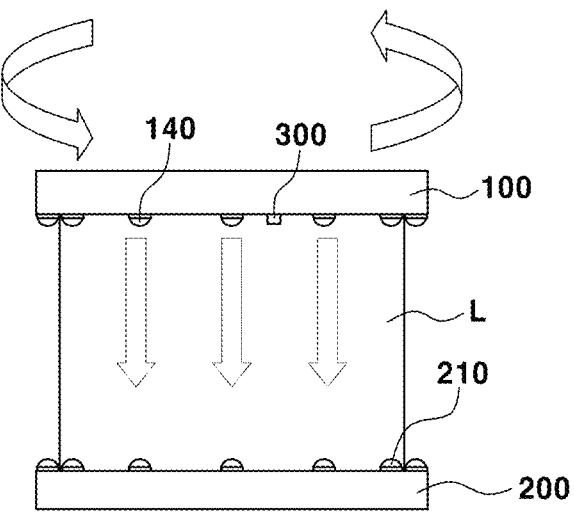
FIGS. 13-17 illustrate the spray operation of the spray structure of the present disclosure.

As illustrated in FIG. 13, in the single-spray mode, the spray valve 160 is disposed in close contact with the end of the rod 110 so that the opening 162 communicates with one radial flow path 152. The compressed air is sprayed out of the upper nozzle 140 to the lidar sensor L through the single radial flow path 152 so that the surface of the lidar sensor L is cleaned. The controller 400 may be configured to activate the driving source 120 to rotate the upper plate 100 with respect to the lidar sensor L so that the entire lidar sensor L is cleaned by the compressed air sprayed.

In addition, the controller 400 may be configured to activate the driving source 120 to rotate the upper plate 100. At the same time, the controller 400 may check the degree of contamination at the surface of the lidar sensor L and determine whether cleaning is necessary through the foreign substance detection sensor 300 mounted on the upper plate 100 to rotate together with the upper plate. In more detail, the controller 400 may be configured to determine a position where the foreign substance detection sensor 300 detects contamination to allow the compressed air to be sprayed to the corresponding position in the single-spray mode.

Figure 14:
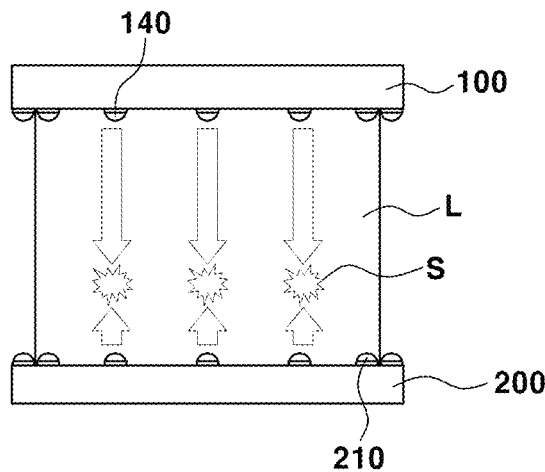
Figure 15:
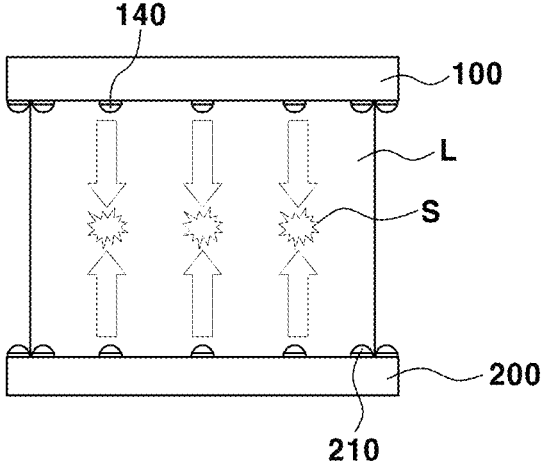
Figure 16:
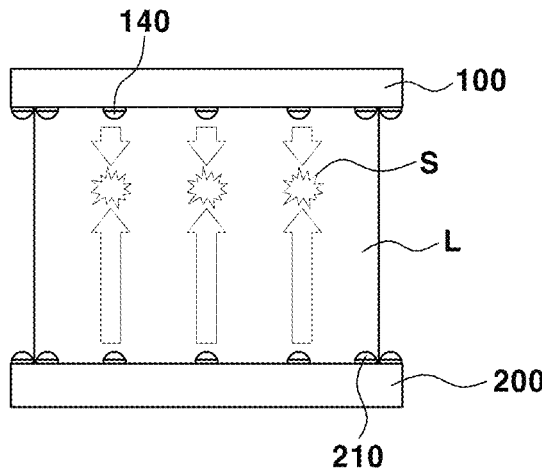

When the overall cleaning of the lidar sensor L is required, the controller 400 may enter the multiple-spray mode. In the multiple-spray mode, the controller 400 is configured to operate the spray valve 160 to move to the multiple-spray position P2. The compressed air through the supply channel 130 is distributed to all of the upper nozzles 140 so that the entire lidar sensor L is cleaned. The controller 400 may carry out the multiple-spray mode while rotating the upper plate 100 by activating the driving source 120. As illustrated in FIGS. 14-16, if the surface of the lidar sensor L is severely contaminated, which makes it difficult to clean the lidar sensor in the single-spray mode, the controller 400 may enter the dual-spray mode. In the double-spray mode, the compressed air is sprayed through both the upper nozzles 140 and the lower nozzles 210. The compressed air may be sprayed simultaneously from both the upper nozzles 140 and the lower nozzles 210 to generate turbulence and/or vortex between the air flows from the upper nozzles 140 and the lower nozzles 210, thereby maximizing the cleaning performance.

According to some embodiments, the controller 400 may be configured to adjust the speed and intensity of a fluid sprayed through the upper nozzles 140 or the lower nozzles 210. For example, depending on where the foreign substance S is located on the surface of a lidar sensor L, the controller 400 may set a target cleaning point by adjusting the speed and intensity of the fluid through the upper nozzles 140 and the lower nozzles 210. Arrows in FIGS. 14-16 indicate the relative strength of the compressed air or fluid coming out of the upper nozzles 140 and the compressed air or fluid coming out of the lower nozzles 210.

Figure 17:
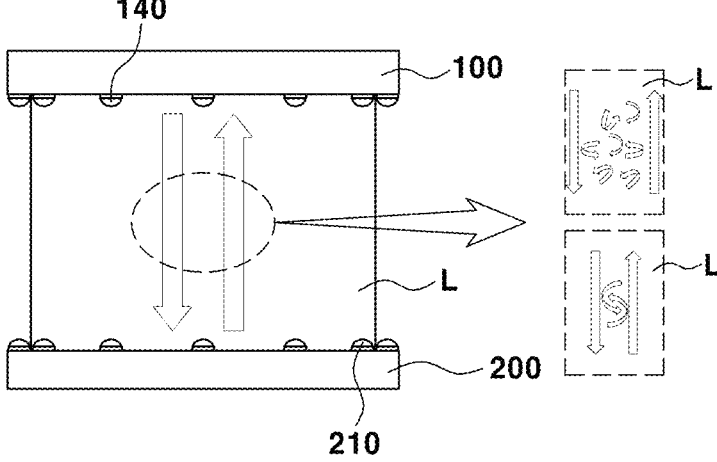

As illustrated in FIG. 17, according to the present disclosure, a vortex and/or turbulence is generated during an air flow simultaneously sprayed from the upper nozzles 140 of the upper plate 100 and the lower nozzles 210 of the lower plate 200. Since the upper nozzles 140 spray the compressed air while rotating, the turbulence and/or vortex may appear in various patterns depending on an interval between upper and lower-side flows.

In addition, the grooves 142 formed on the inner surface of the upper nozzle 140 or the lower nozzle 210 provide straightness to the sprayed fluid, so there is no energy cancellation due to a fluid overlap during mutually reversed fluid spraying. In addition, since the fluid is sprayed while rotating through the grooves 142, the generation of turbulence and vortex may be enhanced between a flow of fluid through the upper nozzles 140 and a flow of fluid through the lower nozzles 210.

According to the present disclosure, it is possible to provide various cleaning patterns to maximize the cleaning performance of a lidar sensor.

In addition, according to the present disclosure, it is possible to measure the degree of contamination of a lidar sensor using a rotary laser sensor.

In addition, according to the present disclosure, it is possible to effectively manage the spray of a washer fluid or compressed air through the spray valve.

The aforementioned present disclosure is not limited by the aforementioned embodiments and the accompanying drawings, and it should be apparent to those having ordinary skill in the art that various substitutions, modifications, and changes may be made without departing the technical sprit of the present disclosure.

What is claimed is:

1. A spray structure for cleaning a sensor, the spray structure comprising:
   a first plate rotatably mounted on a first end of an environmental sensor;
   a second plate mounted on a second end of the environmental sensor to face the first plate, the second end being opposite the first end;
   a plurality of first nozzles formed on the first plate and disposed toward the environmental sensor;
   a plurality of second nozzles disposed on the second plate to face the environmental sensor;
   a fluid supply source configured to supply a fluid to the plurality of first nozzles and the plurality of second nozzles so that the fluid is sprayed through the plurality of first nozzles and the plurality of second nozzles;
   a controller configured to control the operation of the fluid supply source and differently adjust an intensity of the fluid from the plurality of first nozzles and the plurality of second nozzles
   a rod extending from the first plate and being insertable into the environmental sensor; and
   a driving source configured to provide a rotational force to the rod.

2. The spray structure according to claim 1, wherein the rod is provided with a supply channel through which the fluid flows.

3. The spray structure according to claim 1, wherein a plurality of grooves is provided in each inner surface of the first nozzles, wherein each of the plurality of grooves is recessed along the longitudinal direction of the first nozzles.

4. The spray structure according to claim 3, wherein each of the plurality of grooves is formed spirally along the longitudinal direction of the first nozzles.

5. The spray structure according to claim 1, wherein the first plate includes a manifold having a plurality of radial flow paths extending in a radial direction of the first plate to allow the supply channel and the plurality of first nozzles to fluid-communicate with each other.

6. The spray structure according to claim 5, wherein the first plate further includes a spray valve disposed in the manifold in communication with the supply channel, wherein the spray valve is configured to change a flow of fluid from the supply channel through the radial flow path of the manifold.

7. The spray structure according to claim 6, wherein the spray valve includes an opening, and the spray valve has a single-spray position, wherein, in the single-spray position, the opening is positioned to communicate any one of the plurality of radial flow paths with the supply channel.

8. The spray structure according to claim 7, wherein the spray valve is movably disposed in the manifold, wherein the spray valve moves from the single-spray position to a multiple-spray position to fluidly communicate the supply channel with all of the plurality of radial flow paths.

9. The spray structure according to claim 1, wherein the fluid supply source comprises one or more of:
   an air source configured to provide compressed air; or
   a washer fluid supply source configured to provide a washer fluid.

10. The spray structure according to claim 1, wherein the plurality of first nozzles is disposed on the first plate at regular intervals along a circumference of the first plate.

11. The spray structure according to claim 1,
   wherein the controller is further configured to control the operation of the driving source.

12. The spray structure according to claim 11, further comprising:
   a foreign substance detection sensor disposed on the first plate to detect a foreign substance on the environmental sensor,
   wherein the foreign substance detection sensor is configured to inform the controller of the detection of the foreign substance.

13. The spray structure according to claim 11, wherein the controller is configured to rotate the driving source in the single-spray position or the multiple-spray position of the spray valve.

14. The spray structure according to claim 11, wherein the controller is configured to control the fluid supply source so that a flow rate of the fluid through the plurality of first nozzles and a flow rate of the fluid through the plurality of second nozzles are different from each other.

15. The spray structure according to claim 12, wherein the controller is configured to activate the fluid supply source and the driving source based on the information from the foreign substance detection sensor.

16. A method of controlling a spray structure for cleaning a sensor, wherein the spray structure comprises: a plate rotatably mounted on an environmental sensor and including a plurality of nozzles configured to spray a fluid from a fluid supply source toward the environmental sensor; a driving source providing a rotational force to the plate; and a controller configured to control an operation of the fluid supply source, wherein the plate includes a first plate disposed on a first side of the environmental sensor and a second plate disposed on a second side opposite to the first side, wherein one of the first plate or the second plate is fixed, the method comprising: by the controller, actuating the fluid supply source;

selectively driving the driving source while the fluid supply source is being driven, controlling the operation of the fluid supply source such that the fluid is supplied to the first plate and the second plate; and differently adjusting an intensity of the fluid being sprayed from the first plate and an intensity of the fluid being sprayed from the second plate.

17. The method according to claim 16, wherein the spray structure further comprises a foreign substance detection sensor configured to detect whether a foreign substance is attached to the environmental sensor and configured to transmit the detected foreign substance information to the controller, wherein actuating the fluid supply source comprises:

receiving, by the controller, foreign substance information from the foreign substance detection sensor; and activating, by the controller, the fluid supply source based on the foreign substance information.

18. The method according to claim 16, wherein the spray structure further comprises: a spray valve disposed in the plate and configured to supply the fluid from the fluid supply source to any one of the plurality of nozzles in a first position and to supply the fluid from the fluid supply source to all of the plurality of nozzles in a second position, the method further comprising:

controlling, by the controller, movement of the spray valve between the first position and the second position depending on a required cleaning condition.

* * * * *